United States Patent
Butman et al.

(10) Patent No.: US 10,641,649 B1
(45) Date of Patent: May 5, 2020

(54) LASER-BASED DETECTION OF ACOUSTIC SIGNALS IN TURBULENT FLUIDS

(71) Applicant: Phase Coherence, Inc., Torrance, CA (US)

(72) Inventors: Jerry Butman, Aspen, CO (US); Gabriel G. Lombardi, Redondo Beach, CA (US)

(73) Assignee: Phase Coherence, Inc., Torrance, CA (US)

( * ) Notice: Subject to any disclaimer, the term of this patent is extended or adjusted under 35 U.S.C. 154(b) by 420 days.

(21) Appl. No.: 15/585,806

(22) Filed: May 3, 2017

(51) Int. Cl.
| | |
|---|---|
| *G01H 9/00* | (2006.01) |
| *H04B 10/50* | (2013.01) |
| *H04B 10/61* | (2013.01) |
| *G01H 3/04* | (2006.01) |

(52) U.S. Cl.
CPC ............... *G01H 9/00* (2013.01); *G01H 3/04* (2013.01); *H04B 10/503* (2013.01); *H04B 10/6163* (2013.01)

(58) Field of Classification Search
None
See application file for complete search history.

(56) References Cited

U.S. PATENT DOCUMENTS

| | | |
|---|---|---|
| 4,998,225 A | 3/1991 | Shajenko |
| 5,379,270 A | 1/1995 | Connolly |
| 5,504,719 A | 4/1996 | Jacobs |
| 5,610,704 A | 3/1997 | Berzins |
| 5,886,264 A * | 3/1999 | Hu ............... G01H 3/125 356/28 |
| 2007/0103362 A1* | 5/2007 | Arikan ............ G01S 7/295 342/195 |
| 2010/0312500 A1* | 12/2010 | Morgan ............ A61B 5/026 702/49 |
| 2013/0230329 A1* | 9/2013 | Sangawa ............ H04R 23/008 398/133 |

OTHER PUBLICATIONS

Garbini et al., "Measurment of Fluid Turbulence Based on Pulsed Ultrasound Techniques. Part 1. Analysis", 1982, J Fluid Mech., vol. 118, pp. 445-470, (Year: 1982).*
Huffaker, "Laser Doppler Detection System for Gas Velocity Measurement", 1970, Applied Optics., vol. 9, No. 5, pp. 1026-1039 (Year: 1970).*
Caveny et al., Direct Measurements of Acoustic Admittance Using Laser Doppler Velocimetry, AIAA Journal, Jul. 1981, pp. 913-917, vol. 19, No. 7.

(Continued)

*Primary Examiner* — Roy Y Yi
(74) *Attorney, Agent, or Firm* — Van Pelt, Yi & James LLP

(57) ABSTRACT

Extracting a displacement component includes: receiving a received signal resulting from an optical signal being scattered by the plurality of particles in the fluid, the received signal comprising a displacement component; mixing the received signal with a local oscillator signal to generate a mixed signal; detecting the mixed signal via a set of one or more detectors and generating a set of one or more electrical signals based on the detection; demodulating the set of one or more electrical signals to obtain the displacement component; and outputting the displacement component.

27 Claims, 11 Drawing Sheets

(56) References Cited

OTHER PUBLICATIONS

Davis et al., Laser-Doppler Measurement of Complex Acoustic Impedance, Journal of Sound and Vibration, 1986, pp. 451-470, vol. 107, No. 3.
Eversole et al., Frequency-Modulation Detection of Particle Diffusion from Heterodyne Quasi-Elastic Light Scattering, J. Opt. Soc. Am. A, Jul. 1987, pp. 1220-1227, vol. 4, No. 7.
Hanish, A Treatise on Acoustic Radiation, 1983, pp. 377-397, vol. 2.
Jarzynski et al., Fiber Optic Doppler Systems for Remote Sensing of Fluid Flow, SPIE vol. 925 Ocean Optics IX, 1988, pp. 250-254.
Valiere et al., Acoustic Velocity Measurements in the Air by Means of Laser Doppler Velocimetry: Dynamic and Frequency Range Limitations and Signal Processing Improvements, Journal of Sound and Vibration, 2000, pp. 607-626, vol. 229, No. 3.
Vignola et al., Laser Detection of Sound, J. Acoustic Soc. Am., Sep. 1991, pp. 1275-1286, vol. 90, No. 3.

\* cited by examiner

US 10,641,649 B1

LASER-BASED DETECTION OF ACOUSTIC SIGNALS IN TURBULENT FLUIDS

CROSS REFERENCE TO OTHER APPLICATIONS

Background of the Invention

Laser vibrometers employ laser beams to measure vibrations such as acoustic signals. The typical laser vibrometer transmits a laser beam to a detection region and receives a reflection of the laser beam from objects in the detected region. The reflected laser signal has frequency shifts due to Doppler effects produced by the vibrations, and the laser vibrometer detects Doppler shifts in the received reflected laser signal to determine the characteristics of the acoustic signal. Such laser vibrometers function reasonably well for measuring vibrations of rigid objects such as walls or other structures.

When detecting vibrations in a fluid such as the ocean or the atmosphere, existing laser vibrometers often do not produce satisfactory results because they rely on detecting scattered light of small objects that travel in different directions (e.g., dust particles, aerosols, or other debris floating in water or air). The deficiency is especially pronounced when the fluid is turbulent, which means that small objects in the detection region are traveling at various velocities in many directions, and each particle can cause a different Doppler shift to the laser's frequency. Thus, the reflected signal received by the vibrometer has large frequency fluctuations, and the results of traditional detection techniques can be inaccurate. The technique described herein substantially mitigates this limitation caused by turbulent motion of the fluid.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A laser-based displacement detection technique is disclosed. In some embodiments, an optical signal is transmitted in a fluid that has particles. The particles experience movements due to turbulence of the fluid as well as vibrations caused by an acoustic signal or the like. The particles scatter the optical signal, and the scattered signal is received by a receiver. The received signal has a displacement component attributed to the vibrations. The received signal is mixed and converted into a set of one or more electrical signals. The electrical signals are demodulated by performing Fourier transforms and correlating the Fourier coefficients to obtain the displacement component, which provides information about the characteristics of the vibrations.

Figure 1:
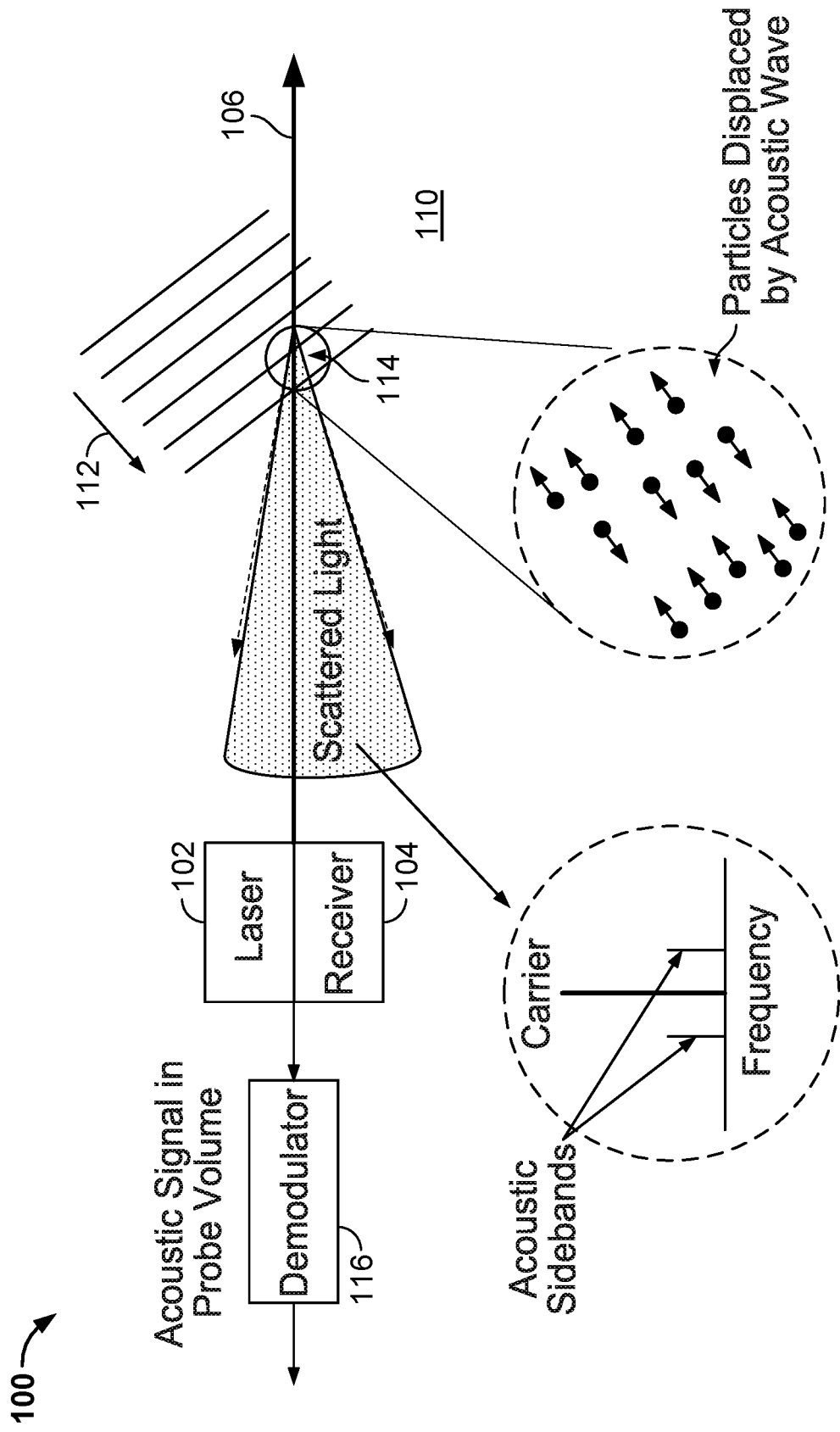
FIG. 1 is a block diagram illustrating an embodiment of a laser-based displacement detector setup.

FIG. 1 is a block diagram illustrating an embodiment of a laser-based displacement detector setup. In this example, a laser-based displacement detector 100 includes a laser 102 and a receiver 104. The laser and the receiver can be co-located or placed at different locations. In this example, laser 102 can be a single-frequency laser, operating on a single longitudinal mode, that emits a light beam 106 having a narrow frequency band. For purposes of discussion, the center frequency of the laser is referred to as $f_c$. The light beam travels through a fluid 110 (e.g., a liquid such as water, a gas such as air, etc.). The fluid can be a single liquid or gas, or a mixture of different substances. In this example, the fluid has particles (e.g., dust particles, aerosols, or other debris) that are large enough to scatter the laser light (e.g., larger in size than the molecules forming the fluid).

In this example, an acoustic wave 112 travels through fluid 110 and displaces particles in probe volume 114 through acoustic vibrations. Although the detection of vibrations caused by an acoustic signal is discussed for purposes of illustration, the technique is also applicable for detecting vibrations caused by other sources. To detect the presence and characteristics of acoustic wave 112, receiver 104 receives some of the light scattered by particles in a probe volume 114, and demodulator 116 demodulates the received light to determine the signal characteristics (e.g., frequency, phase, etc.) of acoustic wave 112. The location and size of the probe volume are configurable. Details of the demodulation are described below in connection with FIGS. 5-7.

Within probe volume 114, particles are displaced by acoustic wave 112 and exhibit acoustic vibrations. The turbulence of the fluid also moves the particles and produces additional motions that are typically considerably larger than the microscopic acoustic vibrations of interest. FIGS. 2A-2D are diagrams illustrating effects of the fluid motion, and the resulting received signal spectrums.

Figure 2A:
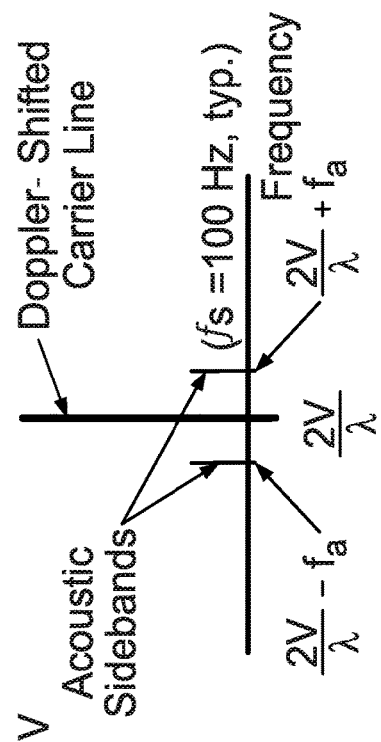
FIGS. 2A-2D are diagrams illustrating effects of the fluid motion, and the resulting received signal spectrums.

FIG. 2A shows an ideal scenario in which turbulence of the fluid moves the particles uniformly at a velocity V. Under ideal conditions, each particle's movement is subject to the same Doppler shift due to the movement of the fluid (also referred to as the macro Doppler shift), and the same Doppler shift due to the acoustic vibration (also referred to as the displacement component).

Figure 2B:
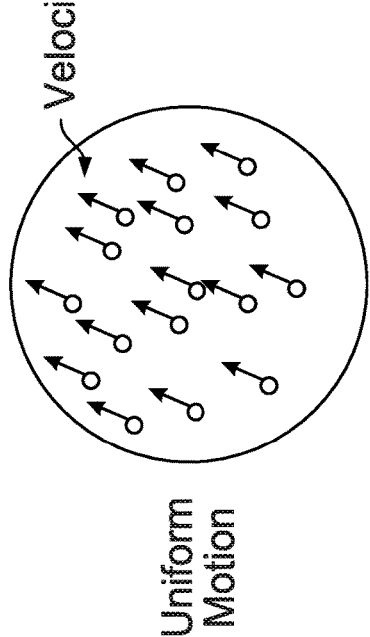

FIG. 2B illustrates the frequency spectrum of the corresponding received signal under ideal conditions. The received signal of the particles under ideal conditions is represented as:

$$S_p = A_1 \cos((\omega_0 + \omega_D)t + \varphi_a(t) + \varphi_{1P}) + \quad (1)$$
$$A_2 \cos((\omega_0 + \omega_D)t + \varphi_a(t) + \varphi_{2P}) + \ldots$$

where $A_1, A_2, \ldots, A_i$, etc. correspond to amplitudes; $\omega_{D1}, \omega_{D2}, \ldots, \omega_{Di}$, etc. correspond to the macro Doppler shift due to fluid motion for particles 1, 2, ..., i, etc., respectively; constants $\varphi_{1p}, \varphi_{2p}, \ldots, \varphi_{ip}$, etc., correspond to phase shifts as the light is scattered by particles 1, 2, ..., i, etc., respectively and received at location p; and $\varphi_a(t)$ is the displacement component caused by the acoustic motion, i.e., $\varphi_a = 4\pi\delta_a/\lambda$, where $\delta_a$=acoustic displacement, $\lambda$=laser wavelength.

The frequency spectrum of the ideal received signal will include three distinct frequencies: a Doppler-shifted carrier frequency at $$\frac{2V}{\lambda},$$

and acoustic side bands at $$\left(\frac{2V}{\lambda} - f_a\right)$$

and $$\left(\frac{2V}{\lambda} + f_a\right),$$

where $\lambda$ is the wave length of the laser signal, and $f_a$ is the frequency of the acoustic wave. The side bands correspond to phase and frequency shifted versions of the carrier frequency. Since there is no frequency fluctuation other than due to the signal, the acoustic signal at frequency $f_a$ can be easily detected using standard heterodyning demodulation techniques.

Figure 2C:
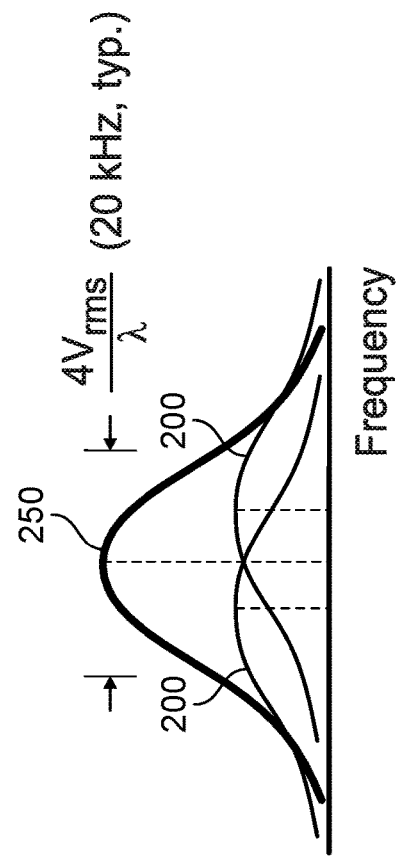
Figure 2D:
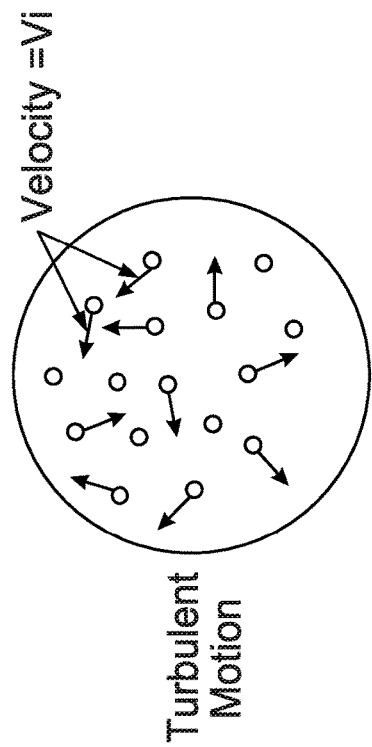

The ideal scenario of FIGS. 2A-2B rarely exists in reality. FIG. 2C shows an actual scenario example in which the turbulence of the fluid moves the particles at many random velocities Vi. FIG. 2D illustrates the resulting frequency spectrum, where the scattering of each particle results in a corresponding received signal frequency spectrum 200 at its own velocity Vi, and the overall frequency spectrum 250 is a combination of the frequency spectrums of light by the particles. The long term (e.g., on the order of seconds or longer) average conforms to a Gaussian distribution of velocities (and consequently Doppler frequencies). In the example shown, the bandwidth of the Doppler spectrum is approximately 20 kHz. To successfully sample the signals within this bandwidth, a sampling rate of twice the bandwidth (approximately 40 kHz) is preferred. This sampling rate is referred to as the Nyquist rate.

Figure 3A:
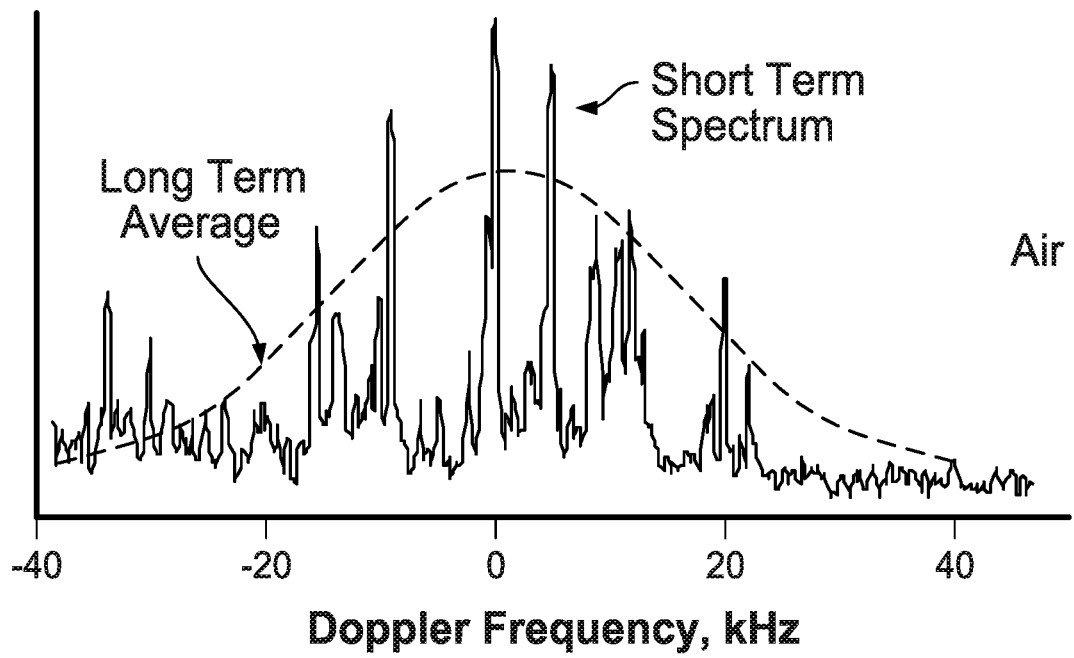
FIGS. 3A and 3B illustrate the long-term average Doppler spectrum and the short-term Doppler spectrum of the received signal in air and water, respectively.
Figure 3B:
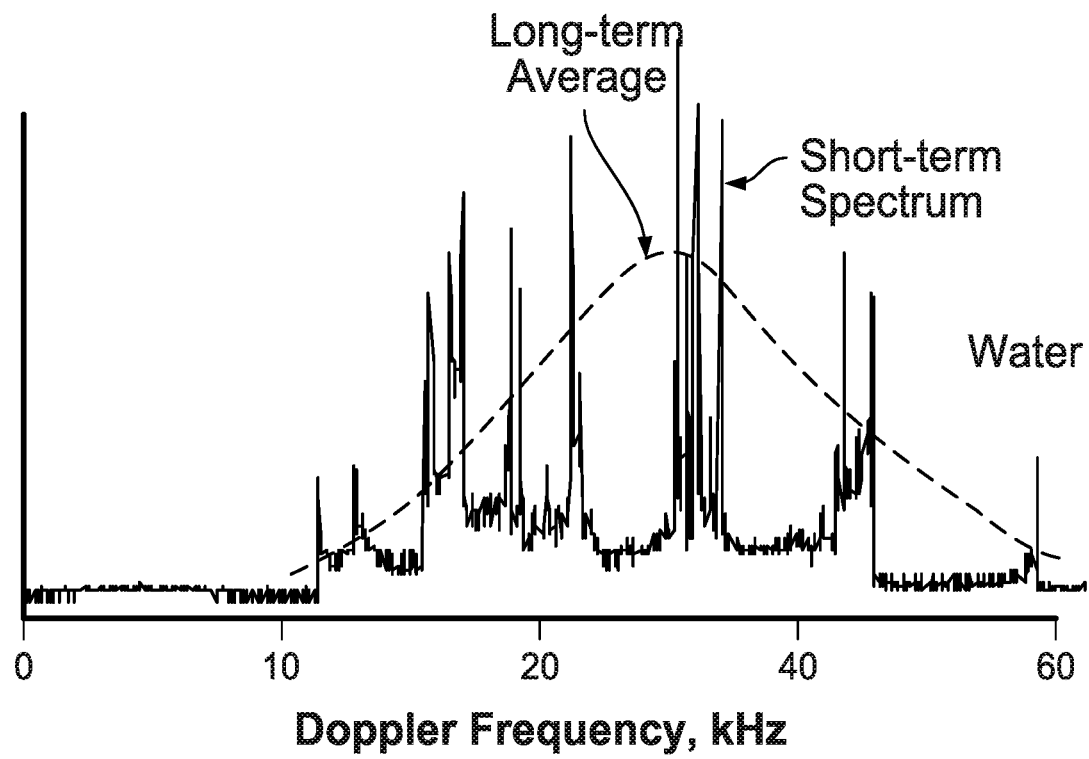

In the short term (e.g., on the order of tens of milliseconds, milliseconds, or shorter), there is typically a significant amount of fluid moving at certain velocities, but little fluid moving at adjacent velocities. Thus, the short-term spectrum exhibits velocity fine grain structures. FIGS. 3A and 3B illustrate the long-term average Doppler spectrum and the short-term Doppler spectrum of the received signal in air and water, respectively. As shown, the short-term spectrum has distinct features, specifically, frequency peaks that correspond to center frequencies arising from sums of particles that are moving at the same velocity due to turbulence, individual particles that are moving at different velocities due to turbulence, or both. Sidebands due to acoustic vibration are replicas of these frequency features with frequency and phase shifts. While the sidebands are not clearly visible in this figure, they can be reconstructed based on the short-term spectrum. As will be described in greater detail below, embodiments of our laser-based displacement detectors exploit this property for acoustic sensing.

Figure 4A:
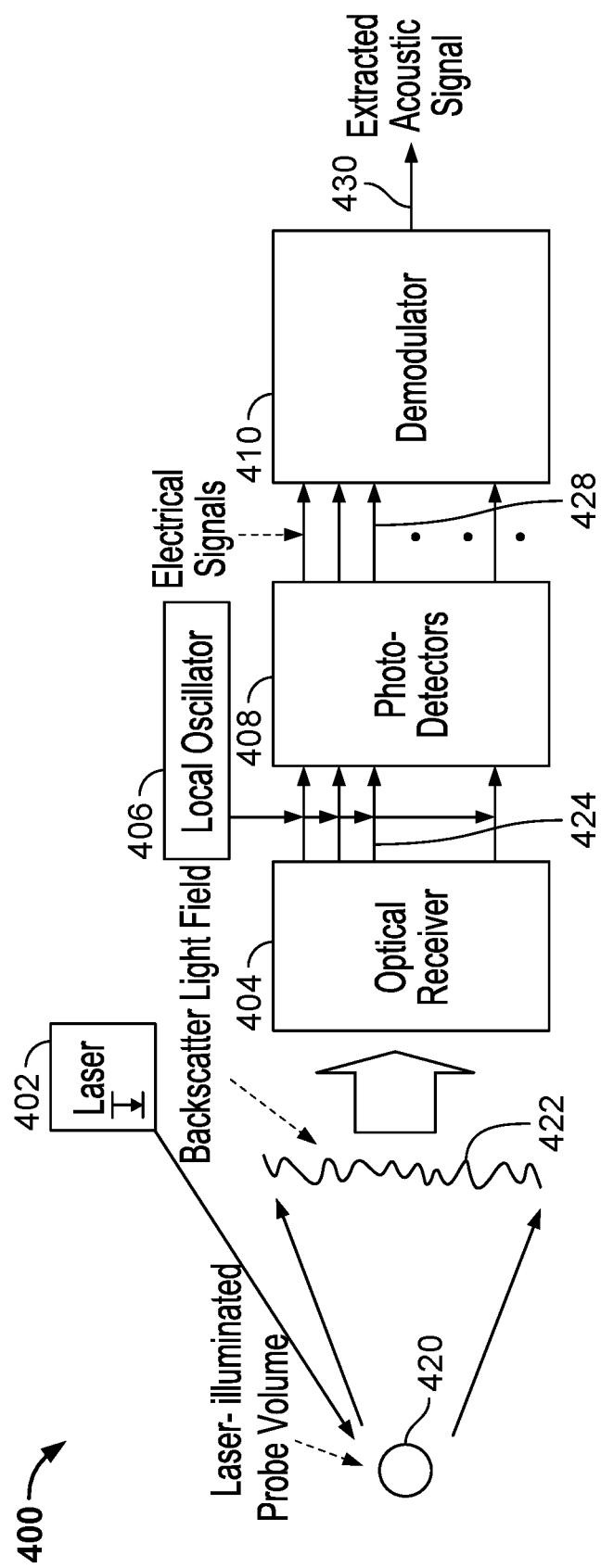
FIG. 4A is a block diagram illustrating an embodiment of a laser-based displacement detector in a bistatic configuration.

FIG. 4A is a block diagram illustrating an embodiment of a laser-based displacement detector. In this example, laser-based displacement detector 400 includes a laser 402 configured to emit an optical signal that illuminates a probe volume 420 in the fluid. Laser 402 can be a gas laser, a chemical laser, an excimer laser, a solid state laser, a fiber laser, a photonic crystal laser, a dye laser, a free-electron laser, or any other type of laser that will emit a single-frequency coherent light beam. Particles within the probe volume scatter the optical signal. The scattered signals interfere and combine to form a backscattered field of light that has a speckle pattern of varying intensity.

An optical receiver 404 is configured to capture light in a number of regions over which the optical phase is approximately uniform (referred to as speckle grains) in the backscattered field of light. The optical receiver can be implemented as a lens or a set of lenses. The optical receiver can be co-located with the laser in a monostatic configuration, or located at a different location than the laser in a bistatic configuration (as shown in the figure). Speckle grains of received light are processed as separate channels through a demodulation process. A local oscillator 406 generates a local oscillator signal, which is mixed with the received signal corresponding to each speckle grain, and directed to a set of one or more photodetectors 408, one for each speckle grain. The local oscillator can be implemented using a laser. The photodetectors can be implemented using an array of image sensors, photodiodes, or other devices that will convert light signals into electrical signals. In some embodiments, an array of photodetectors comprising multiple pixels is used, where a pixel of the photodetector receives a separate channel of light signal and converts the light signal into a corresponding channel of electrical signal.

In some embodiments, local oscillator 406 is configured to generate a local oscillator signal at a different frequency than the optical signal generated by the laser, and local oscillator 406 and photodetectors 408 together heterodyne (down-convert) the light to an electrical signal at a convenient intermediate electrical frequency. In some embodiments, known as homodyne, local oscillator 406 is configured to generate a local oscillator signal at the same frequency as the optical signal, and the local oscillator and photodetectors down-convert the light directly to in-phase and quadrature baseband electrical signals. Photodetectors 408 detect the down-mixed signal.

The electrical signals are sent to a demodulator 410. In this example, demodulator 410 performs Fourier transform and correlates the electrical signal to obtain the acoustic signal. The demodulator can include a programmed computer processor, a programmed digital signal processor (DSP), a general or special purpose circuitry such as an Application Specific Integrated Circuit (ASIC) or Field Programmable Gate Array (FPGA), or any other appropriate processing device, coupled with appropriate memory elements such as random access memory (RAM). Details of the demodulator's operations are described below.

Figure 4B:
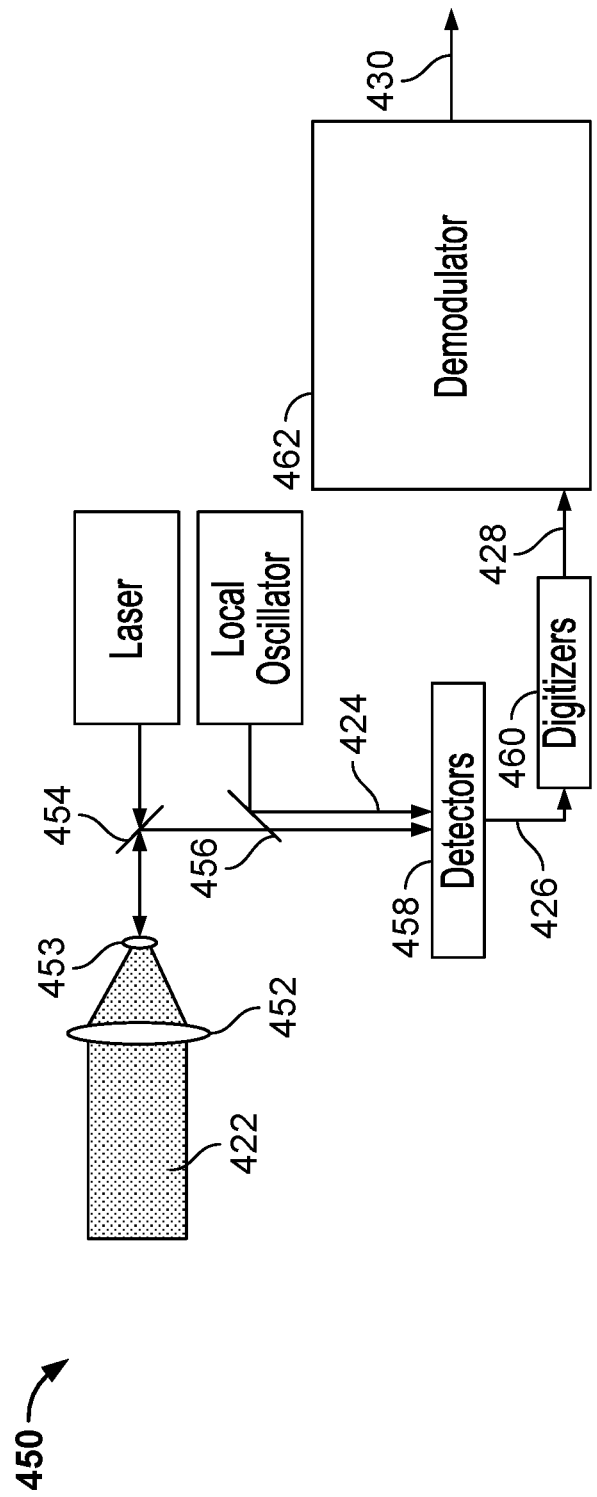
FIG. 4B is a block diagram illustrating an embodiment of a laser-based displacement detector in a range-gated monostatic configuration.

FIG. 4B is a block diagram illustrating an embodiment of a laser-based displacement detector in a monostatic configuration, wherein laser transmitter and optical receiver utilize the same telescope (452 and 453). In this example, laser-based displacement detector 450 includes a set of lenses (452 and 453) and a set of beam splitters (454 and 456) arranged to function as the optical receiver. The beam splitters function as a mixer by combining the received signal with a local oscillator signal. Detectors 458 detect the mixed signals. The outputs of detectors 458 are sent to one or more digitizers 460, which can be implemented using one or more analog to digital converters (ADCs). In some embodiments, the digitizers operate at the Nyquist rate of the Doppler spectrum to convert the input analog signals into digital signals. The digitized signals are sent to demodulator 462. The digitizers' outputs are sent to a demodulator 462 to be demodulated.

Figure 5:
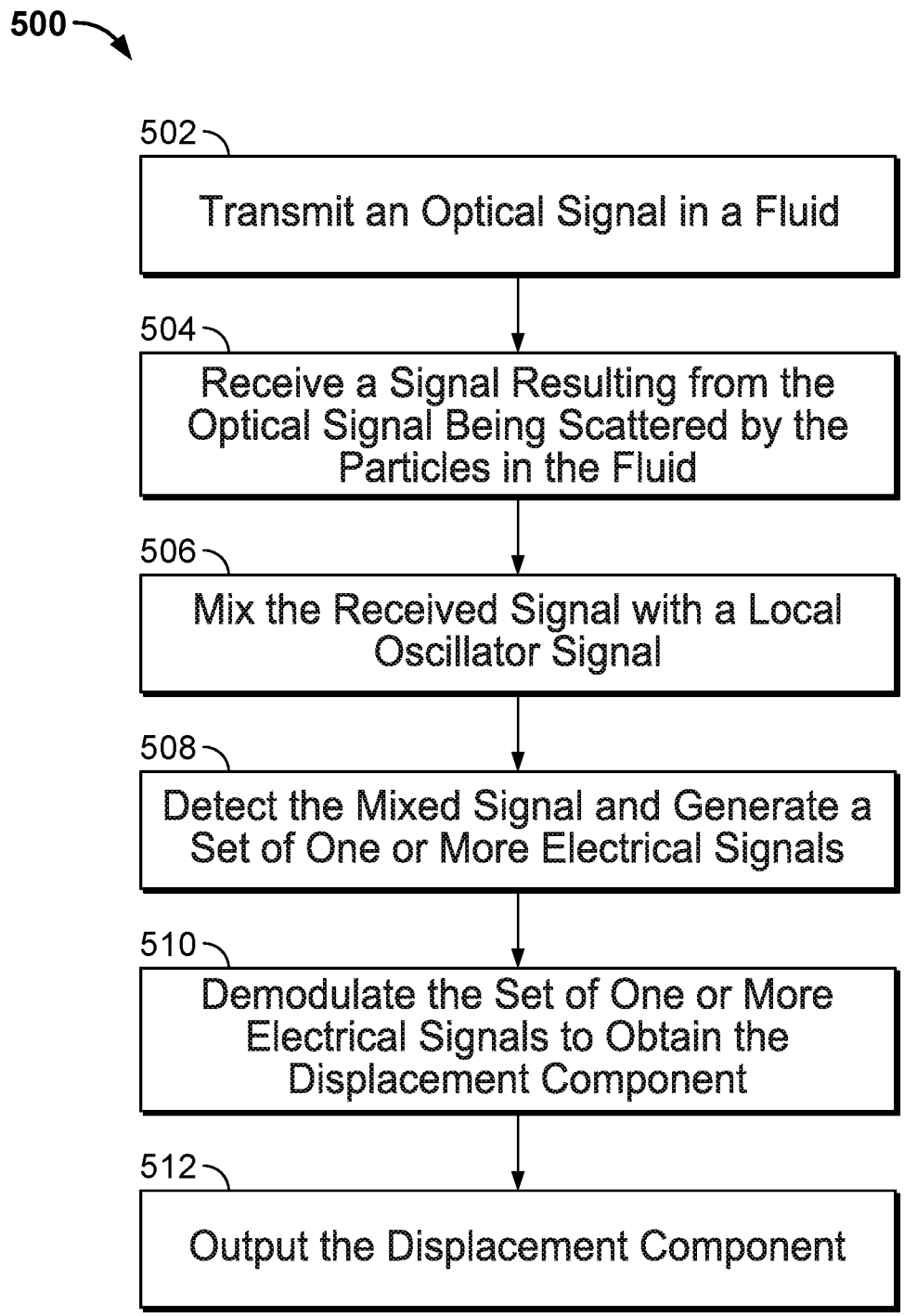
FIG. 5 is an embodiment of a process for detecting a displacement component using a laser.

FIG. 5 is an embodiment of a process for detecting a displacement component using a laser. Process 500 can be performed by a laser-based displacement detector system such as 100, 400, or 450.

At 502, an optical signal is transmitted in a fluid comprising a plurality of particles. The optical signal can be a coherent optical signal emitted by a laser and includes a carrier signal at a single frequency. The optical signal is referred to as a carrier signal, $S_c$. The carrier signal has a frequency of $\omega_0$, and can be expressed as:

$$S_c = \cos(\omega_0 t) \quad (2)$$

At 504, a signal resulting from the optical signal being scattered by the particles in the fluid is received. Referring to FIGS. 4A and 4B, the received signal corresponds to the signals at 422.

Figure 6:
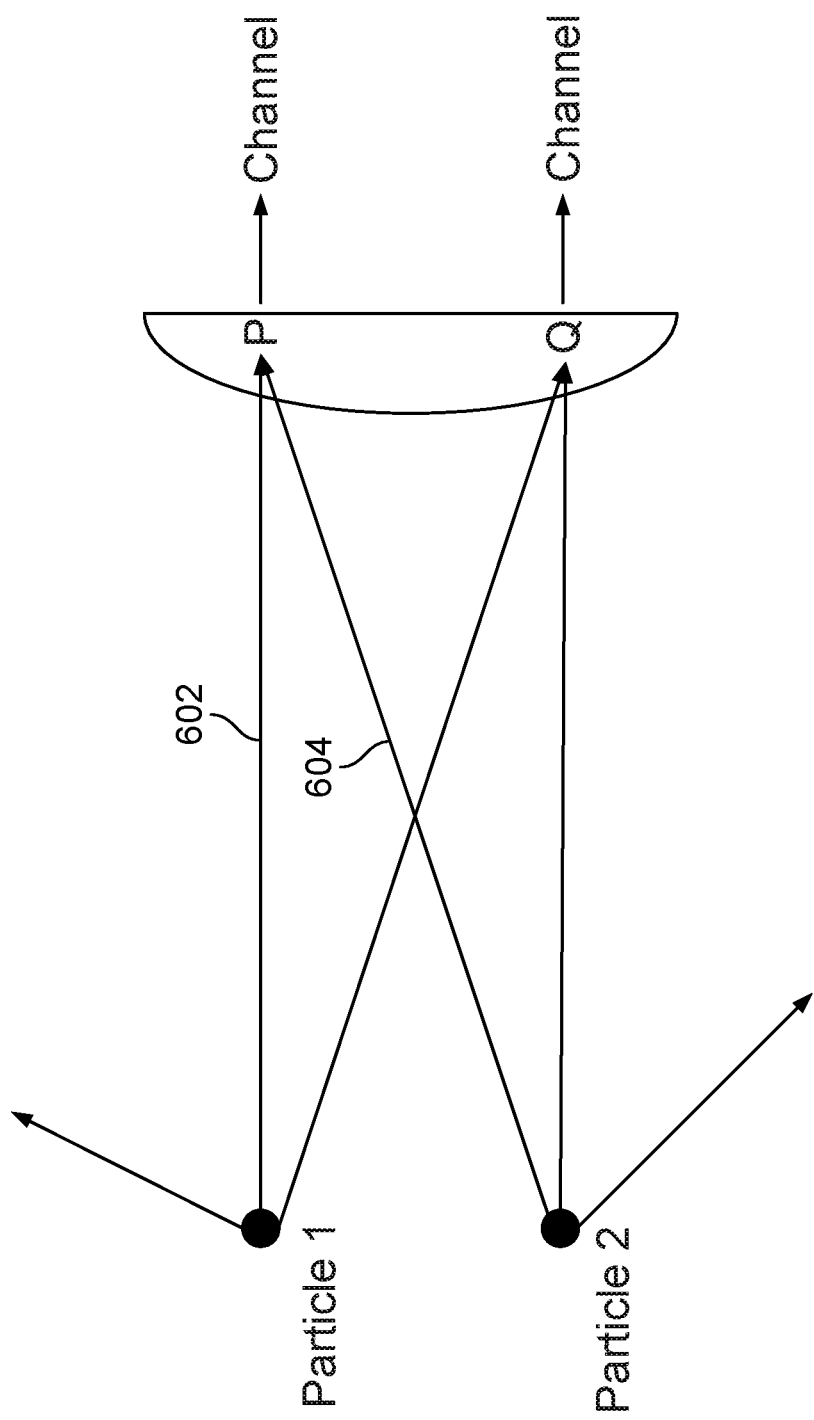
FIG. 6 is a diagram illustrating an example of the received signal.

The received signal includes a displacement component caused by acoustic vibration, thermal fluctuation, etc., as explained in connection with FIG. 6. FIG. 6 is a diagram illustrating an example of the received signal. For purposes of illustration, particles labeled 1, 2, etc. are shown to scatter the optical signal, and the scattered rays labeled 602, 604, etc. are received by the optical receiver at speckle grain positions p=P, Q, etc. Each received speckle grain position is processed as a separate channel p.

For instance, the signal received at a speckle grain position p (denoted as $S_p$), is represented as the combination of rays 602, 604, etc. The received signal can be represented as:

$$S_p = A_1 \cos((\omega_0+\omega_{D1})t+\varphi_a(t)+\varphi_{1p})+A_2 \cos((\omega_0+\omega_{D2})t+ \varphi_a(t)+\varphi_{2p})+ \ldots +A_i \cos((\omega_0+\omega_{Di})t+\varphi_a(t)+\varphi_{ip})+ \ldots \quad (3)$$

where $A_1, A_2, \ldots, A_i$, etc. correspond to amplitudes; $\omega_{D1}, \omega_{D1}, \ldots, \omega_{Di}$, etc. correspond to the macro Doppler shift due to fluid motion for particles 1, 2, ..., i, etc., respectively; constants $\varphi_{1p}, \varphi_{2p}, \ldots, \varphi_{ip}$, etc., correspond to phase shifts as the light is scattered by particles 1, 2, ..., i, etc., respectively and received at location p; and $\varphi_a(t)$ is the displacement component caused by the acoustic motion. Note that the displacement component is the same among the scattered rays since the particles in the detection volume are subject to the same vibration due to the acoustic wave. For this purpose, the volume should be made sufficiently small compared to the acoustic wavelength. The laser-based displacement detector is designed to obtain the displacement component $\varphi_a(t)$ from the received signal. In the context of detecting an acoustic wave, the displacement component is sometimes also referred to as the extracted acoustic signal.

Returning to FIG. 5, at 506, the received signal is mixed (i.e., optically added) with a local oscillator signal to generate a mixed signal for the purpose of down-converting from optical to electrical frequencies. The mixing can be accomplished by using a beam splitter that combines the received signal and the local oscillator signal. The local oscillator signal can be another laser signal with a frequency of $\omega_{LO}$, which when mixed with the received signal brings the signal down to an intermediate frequency (IF) range. Referring to FIGS. 4A and 4B, the signal resulting from mixing corresponds to the signals at 424 and is expressed as:

$$S_{pmixed} = \cos(\omega_{LO}t) + S_p \quad (4)$$

At 508, the mixed signal is detected via a set of one or more photodetectors (e.g., 408 of FIG. 4A or 458 of FIG. 4B), and a set of one or more corresponding electrical signals is generated based on the detected signals. Specifically, the baseband portion of the mixed signal is detected and digitized. The mixed signal can be heterodyned using a local oscillator frequency $\omega_{LO}$ that is different from $\omega_0$, or homodyned to in-phase and quadrature baseband signals using a local oscillator frequency $\omega_{LO}$ that is the same as $\omega_0$. Both heterodyne and homodyne methods are known to those skilled in the art. Referring to FIG. 4B, the down-converted signal corresponds to the signal at 426. Referring to FIG. 6, for speckle grain positions p=P, Q, etc., the corresponding detectors each obtain a signal (in this case, an analog photocurrent) comprising signals being scattered by particles 1, 2, etc., expressed as:

$$I_p(t) = A'_1 \cos((\omega_{IF}+\omega_{D1})t+\varphi_a(t)+\varphi_{1p})+A'_2 \cos((\omega_{IF}+\omega_{D2})t+\varphi_a(t)+\varphi_{2p})+ \ldots \quad (5)$$

where the down-converted frequency, $\omega_{IF}=\omega_O-\omega_{LO}$, is a convenient electrical frequency suitable for further processing. The first step is to down-convert this signal to baseband in-phase and quadrature components, which can be represented as a complex-valued signal:

$$i_p(t) = A_1' e^{i(\omega_{D1}t+\varphi_a(t)+\varphi_{1p})}+A_2' e^{i(\omega_{D2}t+\varphi_a(t)+\varphi_{2p})}+ \ldots \quad (5a)$$

Further, the analog photo currents are digitized (sampled) into a set of electrical signals, which are digital signals denoted as $i_p(t_n)$, where $t_n$ corresponds to discrete sampling time. The digital signals can also be denoted as $i_{p,n}$ where p corresponds to positions P, Q, etc., and n corresponds to the n-th time sample. Referring to FIGS. 4A and 4B, the digital signal corresponds to the signals at 428. p can be viewed as the pixel index of a detector in an array of detectors, which can be a one-dimensional array or a two-dimensional array depending on implementation.

In this example, the sampling is performed by an analog to digital converter (ADC) using known techniques. In various embodiments, the ADC can be included in the photodetector or in the demodulator. The sample rate of the photocurrent for the Fourier transform is preferably set to at least twice the bandwidth of the photocurrent (the Nyquist rate). In some embodiments, the sample rate is empirically determined and adjustable to ensure that the Nyquist criterion is satisfied. The samples in a sampling window are spaced $\Delta t$ in time and are indexed $0, 1, 2, \ldots, n, \ldots, N-1$.

At 510, the set of one or more electrical signals is demodulated to obtain the displacement component. Referring to FIGS. 4A and 4B, the demodulation can be performed by demodulators 410 or 462, and the displacement component corresponds to the outputs at 430.

In this example, demodulating the set of one or more electrical signals includes performing a corresponding set of one or more Fourier transforms on the set of one or more electrical signals to generate a plurality of Fourier coefficients, and correlating the Fourier coefficients with a rectifier function to obtain the displacement component.

To perform Fourier transform, a fast Fourier transform (FFT) or other known Fourier transform implementations can be applied to the set of one or more electrical signals. Suppose that if the frequency bins of each Fourier series are $0, 1, 2, \ldots, m, \ldots, M-1$, the Fourier coefficient for the m-th frequency bin for the p-th channel is expressed as $$F_{m,p}(t) = \sum_{n=0}^{N-1} i_p(t + n\Delta t) e^{-j\frac{2\pi mn}{N}} \quad (6)$$

In this example, correlating the Fourier coefficients to obtain the displacement component includes multiplying the Fourier coefficients with their complex conjugates, applying a rectifier function to the results, summing the rectified results, and taking an average of the sums over available channels. Specifically, the estimate of the displacement component $\varphi_a(t)$ at time t is computed according to the following:

$$\varphi_a(t) = \left\langle \sum_{m=0}^{M-1} F_{m,p}(t) F^*_{m+\mu,p}(t) R_{m,\mu}(t) \right\rangle_p \quad (7)$$

In the above equation, for each channel p, the Fourier coefficients are multiplied with their corresponding complex conjugates and a rectifier function, and the multiplication results are added to generate a sum. An average of sums corresponding to the channels is computed as the displacement component. $F_{m,p}(t)$ is the m-th Fourier coefficient in channel p derived from the T-second record spanning the time interval between $$\left(t - \frac{T}{2}\right)$$

and $$\left(t + \frac{T}{2}\right),$$

where $T=N\Delta t$. The symbol * denotes complex conjugation; the symbol $\langle \ \rangle_p$ denotes an arithmetic average over the channels p=P, Q, etc. In this example, $\langle \ \rangle_p$ is computed by summing the values for the pixels in the photodetector and then dividing the sum by the total number of pixels. $\mu=\text{int}(f_a T+0.5)$, where int( ) is a function that takes an integer part of its input and $f_a$ is the acoustic frequency of interest (or equivalently, the frequency of $\varphi_a$). In some embodiments, several $f_a$'s are computed to extract the full spectrum of the acoustic signal. Additionally, $R_{m,\mu}(t)$ is a rectifier function that preserves the sign of $\langle |F_{m,p}(t)|^2\rangle_p - \langle |F_{m+\mu,p}(t)|^2\rangle_p$. A variety of possible rectifier functions can be used so long as the sign is preserved. Several examples are shown below:

$$R_{m,\mu}(t) = \langle |F_{m,p}(t)|^2\rangle_p - \langle |F_{m+\mu,p}(t)|^2\rangle_p \quad (8)$$

$$R_{m,\mu}(t) = \text{sgn}[\langle |F_{m,p}(t)|^2\rangle_p - \langle |F_{m+\mu,p}(t)|^2\rangle_p] \quad (9)$$

$$R_{m,\mu}(t) = \langle |F_{m+\mu,p}(t)|^2\rangle_p^{-1} - \langle |F_{m,p}(t)|^2\rangle_p^{-1} \quad (10)$$

The duration of sampling time interval, T, is preferably sufficiently short so that the change in Doppler frequency shift during that time is typically no greater than 1/T. This time will depend on the laser wavelength and the turbulence intensity in the fluid. For example, in the atmosphere, under typical conditions, for above 100 m in height relative to the ground level, a T value less than approximately 20 ms is adequate when utilizing a laser with a 10 μm wavelength. In the ocean, utilizing visible wavelengths, a T value less than approximately 100 ms is adequate.

Figure 7:
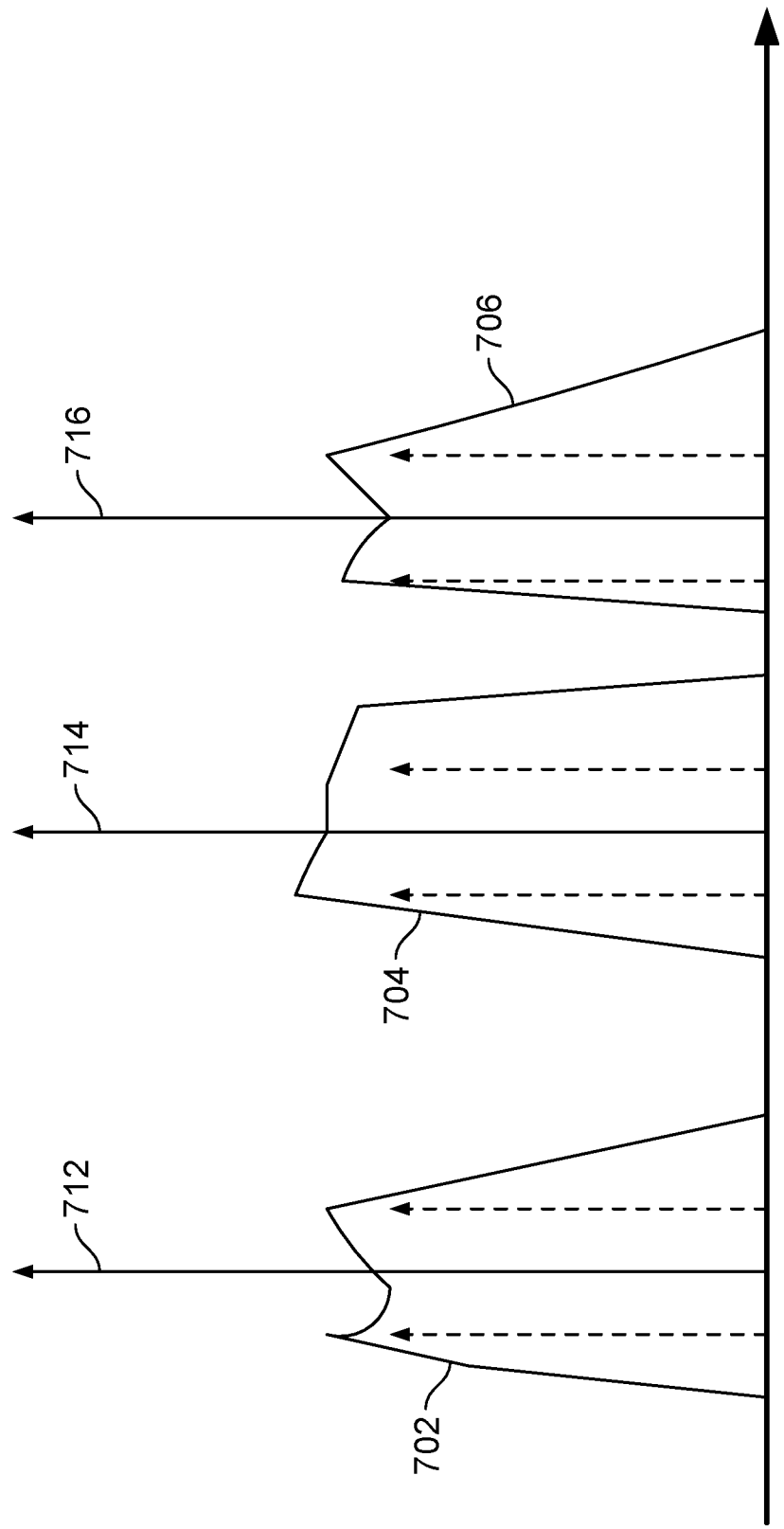
FIG. 7 illustrates the frequency spectrum of an example received signal with distinct spectral features.

In some cases, such as when particles are sparse, the received light can have distinct spectral features. FIG. 7 illustrates the frequency spectrum of an example received signal with distinct spectral features. In this example, the spectral features are distinct, few in number, and do not interfere with each other. Peaks such as 712, 714, and 716 correspond to the center frequencies of scattered signals due to macro Doppler shifts, and these peaks experience shifts due to acoustic vibration. In such a situation, rather than employing the demodulation technique described in equation 6, distinct center frequency-side band sets such as 702, 704, and 706 can be bandpass filtered, and the acoustic signal can be obtained using a narrowband frequency discriminator (e.g., a frequency to amplitude converter, an FM demodulator, a phase demodulator, etc.) centered at each of the carrier frequencies.

At 512, the displacement component is outputted. The displacement component can be displayed visually on a screen (e.g., via an oscilloscope, an oscilloscope application, or the like), played aurally via a microphone, sent to another device or application to be further processed, etc. In some applications, the displacement component can indicate the location and characteristics of an acoustic source and thus provide information about the acoustic source. For example, the displacement component can be used to detect the presence of vehicles from long distances (e.g., submarine in water, plane in air, vehicle on the ground, etc.).

Figure 8:
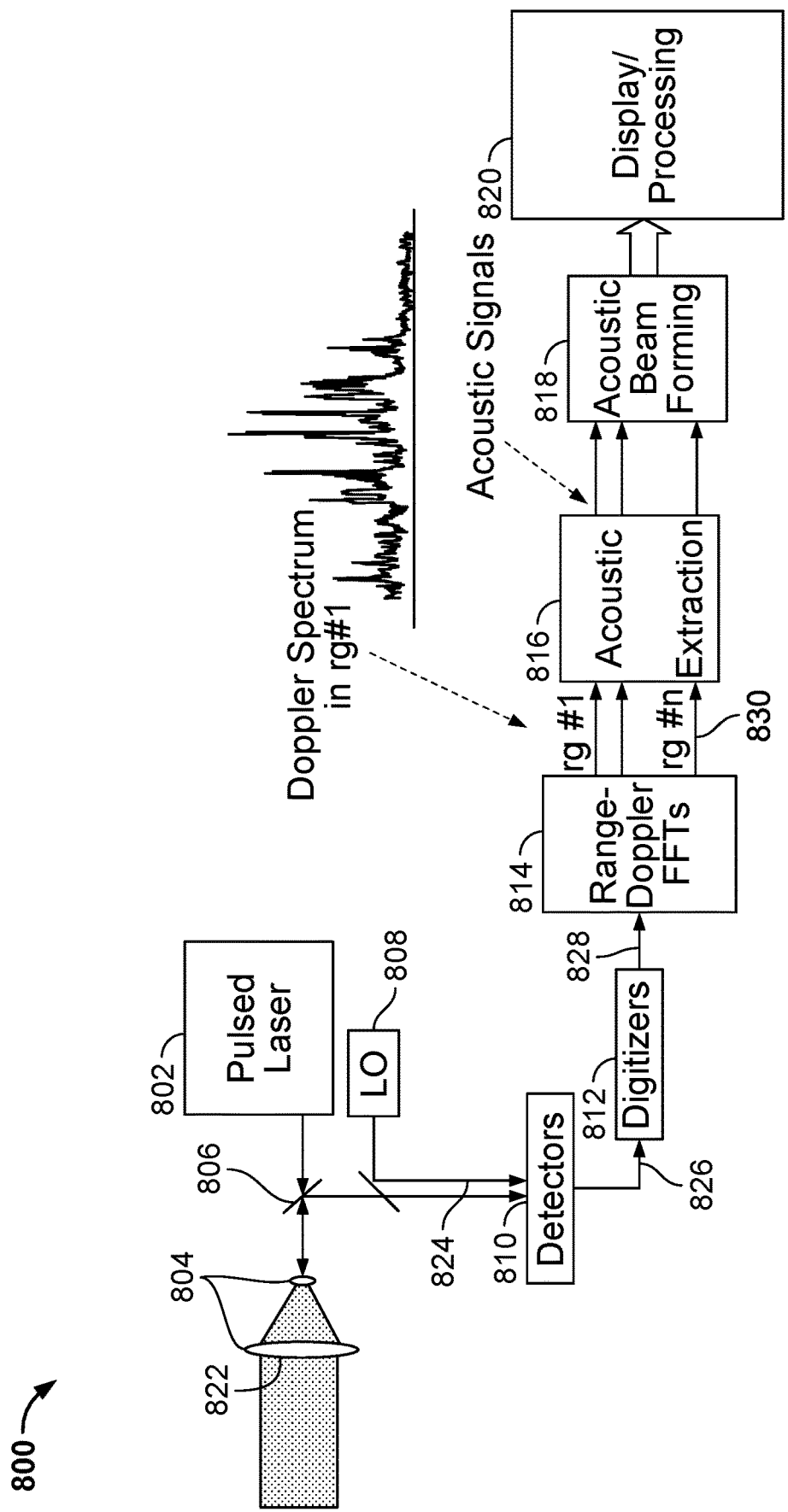
FIG. 8 is a block diagram illustrating an embodiment of a range-gated laser-based displacement detector.

Some embodiments of laser-based displacement detectors are configured to detect a number of probe volumes in the fluid, effectively creating an array of acoustic sensors along the laser beam. Such laser-based displacement detectors are also referred to as range-gated laser-based displacement detectors. FIG. 8 is a block diagram illustrating an embodiment of a range-gated laser-based displacement detector. Range-gated laser-based displacement detector 800 employs the principles of range-gated Doppler radar to generate an array of outputs for acoustic beam forming and other applications.

In range-gated laser-based displacement detector 800, a pulsed laser 802 is configured to generate a pulsed waveform at a certain pulse rate (also referred to as sampling intervals). Along the laser's path, probe volumes are illuminated by the laser pulses at the sampling intervals, and particles within the probe volumes scatter light. The pulse width determines the range extent of the probe volume. The range extents of these probe volumes are referred to as range gates. The repetition rate of the pulses supports Nyquist sampling of the turbulence bandwidth (i.e., the bandwidth of the Doppler spread due to turbulence). Preferably, the repetition rate $1/\Delta t$ is set to the Nyquist rate of turbulence bandwidth. The Nyquist rate is twice the Doppler bandwidth due to turbulence of the fluid (e.g., a Nyquist rate of 40 kHz for a Doppler spectrum with a bandwidth of 20 kHz). The laser preferably operates in a single longitudinal mode during each pulse, but does not need to be coherent pulse to pulse. Such non-coherence can be compensated by a coherent-on-receive technique wherein the phase of each outgoing pulse is measured against a local oscillator (LO) 808. The local oscillator is preferably coherent during the round trip time to the probe volume.

Figure 9:
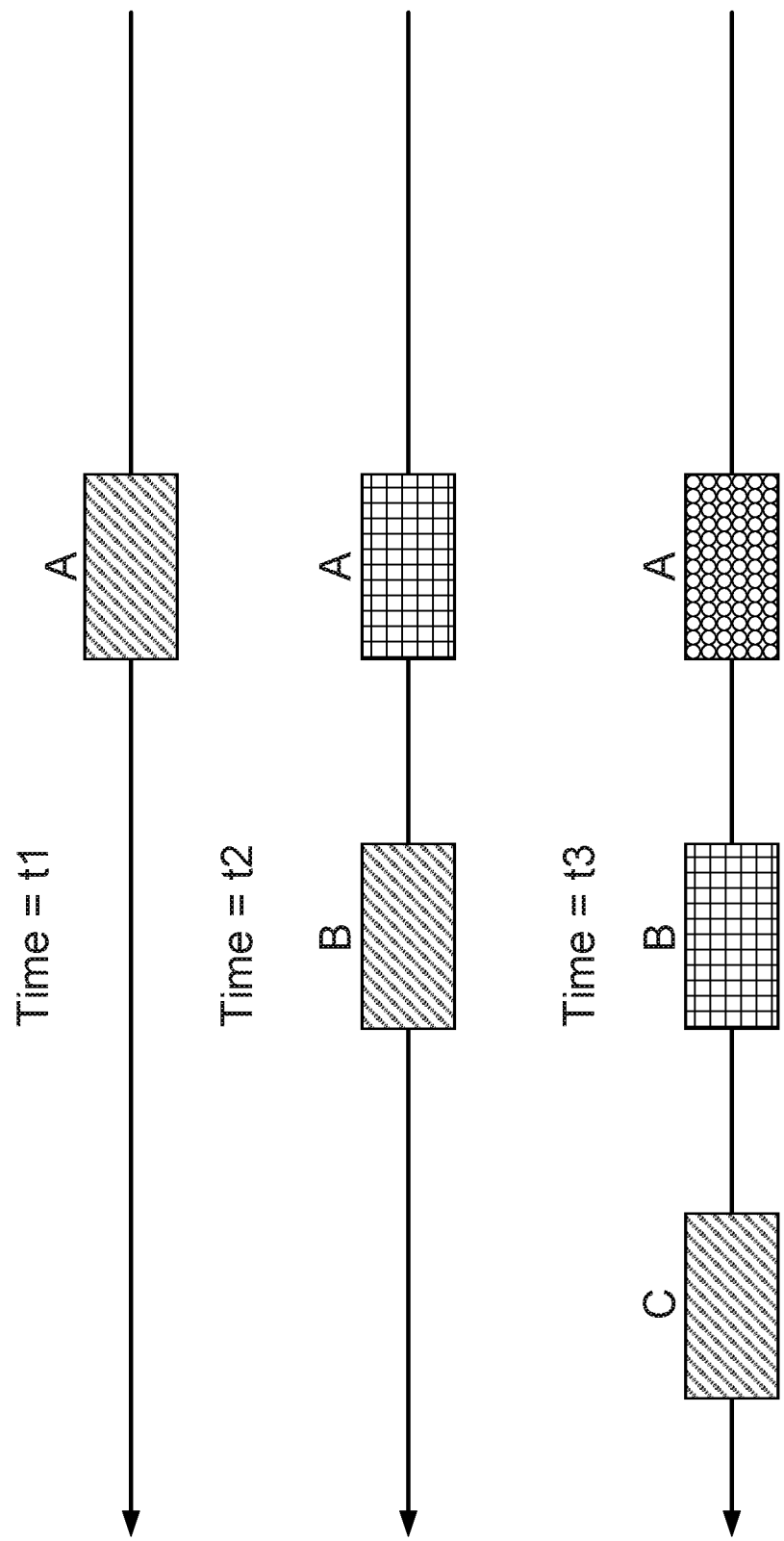
FIG. 9 is a diagram illustrating example range gates.

FIG. 9 is a diagram illustrating example range gates. Suppose that a light pulse travels along the direction of the arrow. The pulse reaches location A at time $t_1=\Delta t$. When the next pulse is emitted and reaches location A at time $t_2=2\Delta t$, the original pulse will reach location B, and so on. The pulse width determines the range extent of range gates g (where g=A, B, etc.). For a probe volume corresponding to a range gate, the particles in the probe volume are subject to their own macro Doppler shifts due to fluid motion, phase shifts, and displacement due to acoustic vibration. Thus, scattered signals from a range gate form a separate frequency domain Doppler spectrum (e.g., a spectrum similar to 304 or 306 of FIGS. 3A and 3B, for each speckle location of each range gate). The laser pulses effectively sample the scattered signals at these probe locations in the time domain.

Returning to FIG. 8, at a speckle position p, for a range gate g, signal 822 that is received by the optical receiver can be represented as:

$$S_{P,g} = A_{1,g} \cos((\omega_0+\omega_{D1,g})t+\varphi_{a,g}(t)+\varphi_{1p,g}) + A_{2,g} \cos((\omega_0+\omega_{D2,g})t+\varphi_{a,g}(t)+\varphi_{2p,g}) + \ldots + A_{i,g} \cos((\omega_0+\omega_{Di,g})t+\varphi_{a,g}(t)+\varphi_{ip,g}) + \ldots \quad (11)$$

where $A_{1,g}, A_{2,g}, \ldots, A_{i,g}$, etc. correspond to amplitudes; $\omega_{D1,g}, \omega_{D2,g}, \ldots, \omega_{Di,g}$, etc. correspond to the macro Doppler shift due to fluid motion for particles 1, 2, ..., i, etc., within range gate g, respectively; constants $\varphi_{1p,g}, \varphi_{2p,g}, \ldots, \varphi_{ip,g}$, etc., correspond to phase shifts as the light is scattered by particles 1, 2, ..., i, etc., within range gate g, respectively and received at location p; and $\varphi_{a,g}(t)$ is the displacement component caused by the acoustic wave at the location of range gate g in the fluid.

The sampled scattered light signals are collected by an optical receiver (which comprises a set of lenses 804 and a set of beam splitters 806) and, as described regarding FIGS. 4A and 4B (viz., Equations (3) through (5a)), mixed with a local oscillator frequency $\omega_{LO}$ to be heterodyned to a convenient intermediate frequency, or homodyned to in-phase and quadrature baseband.

For speckle position p (such as P, Q, etc.) at range gate g (such as A, B, etc.), a corresponding output 826 from photodetector 810 is expressed, similar to Equation (5a), as the following baseband signals:

$$i_{p,g}(t) = A_{1,g}' e^{i(\omega_{D1,g}t+\varphi_{a,g}(t)+\varphi_{1p,g})} + A_{2,g}' e^{i(\omega_{D2,g}t+\varphi_{a,g}(t)+\varphi_{2p,g})} + \ldots \quad (12)$$

The baseband signals are digitized by a set of digitizers 812, and successive echoes are recorded and decomposed into their range-Doppler components in 814. That is, for a speckle position p and range gate g, a short-term record of successive samples $i_{p,g}(t_n)$, one sample for each laser pulse, is obtained. For example, a short-term record can include 2048 samples corresponding to 2048 laser pulses returned from range gate g, where a sample is separated from the next sample by a pulse-to-pulse time $\Delta t$.

Similar to laser-based displacement detector 400 of FIG. 4A, Fourier transforms are performed on the short-term records by range-Doppler Fast Fourier Transformer 814 to obtain the Fourier coefficients. The Fourier coefficients obtained for a range gate i (that is, an input 830 to acoustic extraction module 816) is expressed as follows:

$$F_{m,p,g}(t) = \sum_{n=0}^{N-1} i_{p,g}(t+n\Delta t)e^{-j\frac{2\pi mn}{N}} \quad (13)$$

The acoustic extraction module 816 performs correlation of the Fourier coefficients according to equation (7) to obtain the displacement component (in other words, the acoustic signal). A separate acoustic output $\varphi_{a,g}(t)$ is thus obtained for various range gates g. These acoustic outputs can then be further processed. For example, the acoustic signals can be output to an acoustic beam forming application (e.g., software implementing standard acoustic beam forming algorithms) to detect the location of the acoustic wave source, the signature, as well as other characteristics of the acoustic wave, and display the information to the end user in a display/processing module 820. The display/processing module can be implemented using screens, speakers, processors, etc. The implementation of acoustic beam forming algorithms is known to those skilled to the art.

Although a single pulsed laser is depicted in FIG. 8, the technique described can be expanded to employ multiple laser beams along with corresponding receivers to generate a multi-dimensional array to provide more detailed input to the acoustic beam forming module 818 and obtain more accurate location and other characteristics information.

Figure 10:
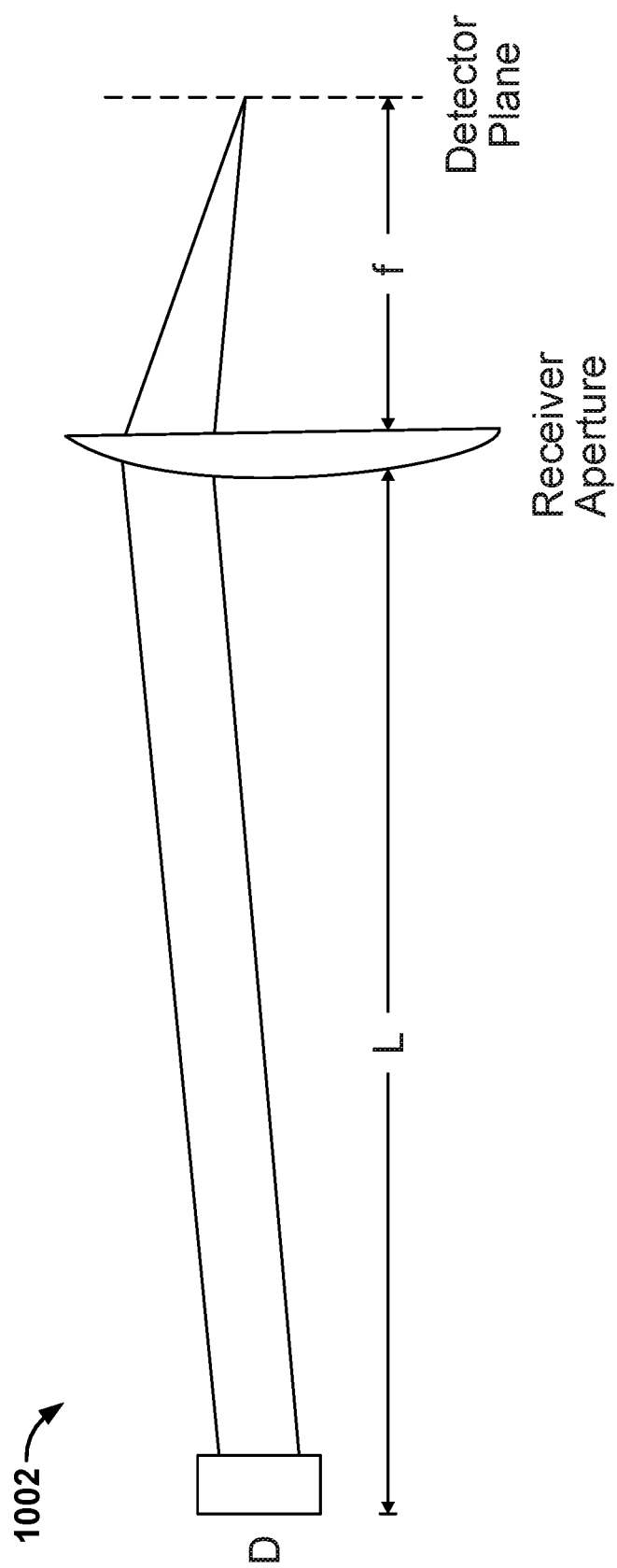
FIG. 10 is a block diagram illustrating an embodiment of a receiver.

FIG. 10 is a block diagram illustrating an embodiment of a receiver. In this example, receiver optical system 1002 includes a set of one or more lenses. A single lens is shown for purposes of illustration but multiple lenses can be used. D corresponds to the diameter of the part of the target that is illuminated (or equivalently, the diameter of the probe volume). The value of D is configurable. $\lambda$ corresponds to the wavelength of the laser light. L corresponds to the distance from the target to the receiver aperture. f corresponds to the focal distance (also referred to as the focal length) of the optical system as determined by the physical properties of the optical system. The Fresnel number $N_F$ is defined as follows:

$$N_F = \frac{D^2}{\lambda L} \quad (14)$$

In this case, the Fresnel number is large (e.g., $N_F \gg 1$), and the receiver aperture is in the near field of the target. The speckle pattern evolves rapidly with motion of the target, approximately move laterally across the aperture with the speed of the target. By using a lens or combination of lenses to spatially Fourier transform the optical field, the rapid temporal evolution of the speckles is avoided, thereby increasing their coherence time. When $N_F \gg 1$, the Fourier transform plane is at the focal distance, f, from the lens. Thus, the detector is preferably placed at the focal distance from receiver optical system 1002 so that the detector is located at the image of the Fourier transform plane of the target, thereby making the detector less sensitive to relative motion of the target and the receiver.

A laser-based displacement detection technique has been described. The technique greatly improves accuracy and reduces noise when detecting a displacement of particles in a probe volume in a turbulent fluid, where the displacement is caused by actions of an acoustic wave or other source on the fluid and the particles.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a received signal resulting from an optical signal being scattered by a plurality of particles in a fluid, the received signal comprising a displacement component;
   mixing the received signal with a local oscillator signal to generate a mixed signal;
   detecting the mixed signal via a set of one or more detectors and generating a set of one or more electrical signals based on the detected mixed signal;
   demodulating the set of one or more electrical signals to obtain the displacement component, including:
      performing a set of one or more Fourier transforms on corresponding ones of the set of one or more electrical signals to generate a plurality of sets of Fourier coefficients; and
      correlating the plurality of sets of Fourier coefficients to obtain the displacement component; and
   outputting the displacement component to be displayed or further processed.

2. The method of claim 1, further comprising transmitting the optical signal using a laser.

3. The method of claim 1, wherein the displacement component is caused by an acoustic signal.

4. The method of claim 1, wherein the displacement component indicates presence of an acoustic wave in the fluid.

5. The method of claim 1, wherein the set of one or more electrical signals are digitized signals.

6. The method of claim 1, wherein the correlating of the plurality of sets of Fourier coefficients to obtain the displacement component includes:
   for a channel in the plurality of channels:
      multiplying a set of Fourier coefficients with a corresponding set of complex conjugates and a rectifier function; and
      adding results of the multiplication to generate a sum; and
   computing an average of sums corresponding to the plurality of channels.

7. The method of claim 1, wherein the correlating of the plurality of sets of Fourier coefficients to obtain the displacement component is performed according to $$\varphi_a(t) = \left\langle \sum_{m=0}^{M-1} F_{m,p}(t) F^*_{m+\mu,p}(t) R_{m,\mu}(t) \right\rangle_p,$$

wherein:
$F_{m,p}(t)$ corresponds to an m-th Fourier coefficient in channel p derived from a T-second record spanning a time interval between $$\left(t - \frac{T}{2}\right)$$

and $$\left(t + \frac{T}{2}\right),$$

T corresponding to a sampling period;
* denotes complex conjugation;
$\langle \rangle_p$ denotes an average over the plurality of channels;
$\mu = \text{int}(f_a T + 0.5)$, where int( ) corresponds to a function that takes an integer part of its input and $f_a$ corresponds to an acoustic frequency of interest; and
$R_{m,\mu}(t)$ corresponds to a rectifier function that preserves sign of $\langle |F_{m,p}(t)|^2 \rangle_p - \langle |F_{m+\mu,p}(t)|^2 \rangle_p$.

8. The method of claim 1, wherein the demodulating of the set of one or more electrical signals to obtain the displacement component includes:
   detecting the frequencies of distinct features in the Doppler spectrum;
   bandpass filtering the received signal at the detected frequencies; and
   applying a frequency discriminator to bandpass filtered results.

9. The method of claim 1, wherein the optical signal includes a pulsed waveform.

10. The method of claim 1, wherein:
    the optical signal includes a pulsed waveform; and
    a repetition rate of the pulsed waveform corresponds to a Nyquist rate of a Doppler spectrum due to turbulence of the fluid.

11. The method of claim 1, wherein:
    the optical signal includes a pulsed waveform;
    the set of one or more electrical signals includes a plurality of short-term records corresponding to a plurality of range gates; and
    the demodulating of the set of one or more electrical signals to obtain the displacement component includes:

performing Fourier transforms on the plurality of short-term records to obtain a corresponding plurality of Fourier coefficients corresponding to the plurality of range gates; and correlating the Fourier coefficients to obtain the displacement component.

12. The method of claim 1, wherein:

the optical signal includes a pulsed waveform; and the outputted displacement component is subject to acoustic beam forming processing.

13. The method of claim 1, wherein the received signal is received by an optical receiver with a focal distance, and wherein the detection of the mixed signal is performed by the set of one or more detectors placed at the focal distance from the optical receiver.

14. A system, comprising:

an optical receiver configured to receive a signal resulting from an optical signal being scattered by a plurality of particles in a fluid, the received signal comprising a displacement component;

a mixer configured to mix the received signal with a local oscillator signal to generate a mixed signal;

one or more detectors configured to detect the mixed signal and generate a set of one or more electrical signals based on the detected mixed signal; and a demodulator configured to demodulate the set of one or more electrical signals to obtain the displacement component, including to:

perform a set of one or more Fourier transforms on corresponding ones of the set of one or more electrical signals to generate a plurality of sets of Fourier coefficients; and correlate the plurality of sets of Fourier coefficients to obtain the displacement component.

15. The system of claim 14, further comprising a laser configured to transmit the optical signal.

16. The system of claim 14, wherein the displacement component is caused by an acoustic signal.

17. The system of claim 14, wherein the displacement component indicates presence of an acoustic wave in the fluid.

18. The system of claim 14, wherein the one or more detectors comprises one or more photodetectors coupled to one or more analog to digital converters.

19. The system of claim 14, wherein to correlate the plurality of sets of Fourier coefficients to obtain the displacement component includes to:

for a channel in the plurality of channels:

multiply a set of Fourier coefficients with a corresponding set of complex conjugates and a rectifier function; and add results of the multiplication to generate a sum; and compute an average of sums corresponding to the plurality of channels.

20. The system of claim 14, wherein to correlate the plurality of sets of Fourier coefficients to obtain the displacement component is performed according to $$\varphi_a(t) = \left\langle \sum_{m=0}^{M-1} F_{m,p}(t) F^*_{m+\mu,p}(t) R_{m,\mu}(t) \right\rangle_p,$$

wherein:

$F_{m,p}(t)$ corresponds to an m-th Fourier coefficient in channel p derived from a T-second record spanning a time interval between $$\left(t - \frac{T}{2}\right)$$

and $$\left(t + \frac{T}{2}\right),$$

T corresponding to a sampling period;

* denotes complex conjugation;

$\langle \rangle_p$ denotes an average over the plurality of channels;

$\mu = \text{int}(f_a T + 0.5)$, where int( ) corresponds to a function that takes an integer part of its input and $f_a$ corresponds to an acoustic frequency of interest; and $R_{m,\mu}(t)$ corresponds to a rectifier function that preserves sign of $\langle |F_{m,p}(t)|^2 \rangle_p - \langle |F_{m+\mu,p}(t)|^2 \rangle_p$.

21. The system of claim 14, wherein the demodulator is configured to:

detect the frequencies of distinct features in the Doppler spectrum;

bandpass filter the received signal at the detected frequencies; and apply a frequency discriminator to bandpass filtered results.

22. The system of claim 14, further comprising a pulsed laser configured to transmit a pulsed waveform as the optical signal.

23. The system of claim 14, further comprising a pulsed laser configured to transmit a pulsed waveform as the optical signal, wherein:

a repetition rate of the pulsed waveform corresponds to a Nyquist rate of a Doppler spectrum due to turbulence of the fluid.

24. The system of claim 14, further comprising a pulsed laser configured to transmit a pulsed waveform as the optical signal, wherein:

the set of one or more electrical signals includes a plurality of short-term records corresponding to a plurality of range gates.

25. The system of claim 14, further comprising a pulsed laser configured to transmit a pulsed waveform as the optical signal, wherein:

the displacement component is subject to acoustic beam forming processing.

26. The system of claim 14, wherein the received signal is received by an optical system with a focal distance, and the one or more detectors are placed at the focal distance from the optical system.

27. A computer program product embodied in a tangible non-transitory computer readable storage medium and comprising computer instructions for:
- receiving a set of one or more electrical signals, the set of one or more electrical signals being generated by:
  - receiving a received signal resulting from an optical signal being scattered by a plurality of particles in a fluid, the received signal comprising a displacement component;
  - mixing the received signal with a local oscillator signal to generate a mixed signal;
  - detecting the mixed signal via a set of one or more detectors and generating the set of one or more electrical signals based on the detected mixed signal;
- demodulating the set of one or more electrical signals to obtain the displacement component, including:
  - performing a set of one or more Fourier transforms on corresponding ones of the set of one or more electrical signals to generate a plurality of sets of Fourier coefficients; and
  - correlating the plurality of sets of Fourier coefficients to obtain the displacement component; and
- outputting the displacement component to be displayed or further processed.

* * * * *